United States Patent
Merklein et al.

(10) Patent No.: US 6,471,496 B1
(45) Date of Patent: *Oct. 29, 2002

(54) PISTON PUMP FOR A VEHICLE BRAKE SYSTEM

(75) Inventors: Deter Merklein, Kempten; Andreas Weh, Durach; Michael Hellebrandt, Burgberg, all of (DE)

(73) Assignee: Robert Bosch GmbH, Stuttgart (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/269,572
(22) PCT Filed: May 28, 1998
(86) PCT No.: PCT/DE98/01458
§ 371 (c)(1), (2), (4) Date: Oct. 28, 1999
(87) PCT Pub. No.: WO99/06697
PCT Pub. Date: Feb. 11, 1999

(30) Foreign Application Priority Data

Jul. 30, 1997 (DE) ......................................... 197 32 811
Nov. 17, 1997 (DE) ......................................... 197 50 851

(51) Int. Cl.$^7$ ........................... F04B 39/10; F04B 53/12; F04B 53/10; F01B 31/00; F01J 1/00
(52) U.S. Cl. ....................... 417/569; 417/554; 417/562; 92/108; 92/172; 92/255; 92/260
(58) Field of Search ................................ 417/554, 562, 417/569, 559; 92/108, 172, 255, 260

(56) References Cited

U.S. PATENT DOCUMENTS

| | | | | |
|---|---|---|---|---|
| 3,912,045 A | * | 10/1975 | Morris | 417/554 |
| 5,123,819 A | * | 6/1992 | Schuller et al. | 417/569 |
| 5,395,219 A | * | 3/1995 | Hosoya et al. | 417/549 |
| 5,746,111 A | * | 5/1998 | Mueller et al. | 92/168 |

* cited by examiner

Primary Examiner—Charles G. Freay
Assistant Examiner—Timothy P. Solak
(74) Attorney, Agent, or Firm—Ronald E. Greigg

(57) ABSTRACT

To enable economical production of a piston for a piston pump, the piston is made from a tubular deformed part and a closure plug, which is press-fitted with a protrusion into the deformed part. The piston has the advantage that the piston can be made without metal cutting in the form of deformed parts, for instance by extrusion, and hence can be produced quickly and economically.

11 Claims, 2 Drawing Sheets

PISTON PUMP FOR A VEHICLE BRAKE SYSTEM

PRIOR ART

The invention relates to a piston pump which is intended for use as a return feed pump for a slip-controlled vehicle brake system.

Such piston pumps are known per se. For example, see the piston pump disclosed in German Patent Disclosure DE 40 27 794 A1. This known piston pump has a pump housing, in which a piston that can be driven to execute a reciprocating stroke motion is axially displaceably received. For fluid admission, the piston of the known piston pump has an axial bore, which extends to approximately the middle of the piston and is intersected by a transverse bore. At an orifice of the axial bore at one face end of the piston, a valve seat made by metal cutting machining is provided for a check valve, which in the known piston pump forms an inlet valve. The piston is a part made by metal-cutting machining in the form of drilling and turning on a lathe. The piston is complicated and expensive to make.

ADVANTAGES OF THE INVENTION

The piston of the piston pump of the invention is a deformed part, which is made for instance by upsetting or extrusion. In the same operation as the production of the piston, a flow conduit is also made without metal cutting, for instance in the form of an axial hole for admitting or discharging fluid. A valve seat of a check valve, which may form an inlet or outlet valve of the piston pump of the invention, is also formed onto the piston in the same operation with the production of the piston. The valve seat can be formed on the piston on a face end of the piston at an orifice of the flow conduit, for instance, or on an annular shoulder inside the flow conduit. Making the valve seat by deformation without metal cutting has the advantage of hardening the material, and the dimensional stability and strength of the material can be increased by a concluding swaging or reswaging of the valve seat. If the piston is guided by slide rings in the pump housing, remachining of the circumferential surface of the piston by fine lathing, grinding, honing or the like becomes unnecessary.

The piston pump of the invention has the advantage that its piston can be made entirely without metal-cutting machining, by deformation in a single operation or in only a few deforming steps. This makes the piston fast and economical to produce, and there is no waste of material. Remachining the piston surface or making bores, grooves or the like by metal-cutting machining, which in piston production would require additional machining steps and machining tools, also becomes unnecessary. The valve seat hardened by deformation has the further advantage of greater wear resistance and thus a longer service life.

The piston pump of the invention is intended in particular as a pump in a brake system of a vehicle and is used to control the pressure in wheel brake cylinders. Depending on the type of brake system, the abbreviations ABS, ASR, FDR and EHB are used for such brake systems. In the brake system, the pump serves for instance to return brake fluid from a wheel brake cylinder or a plurality of wheel brake cylinders to a master cylinder (ABS) and/or to pump brake fluid out of a supply container into a wheel brake cylinder or a plurality of wheel brake cylinders (ASR or FDR or EHB). The pump is needed in a brake system with wheel slip control (ABS or ASR) and/or a brake system serving as a steering aid (FDR) and/or an electrohydraulic brake system (EHB). With the wheel slip control (ABS or ASR), locking of the wheels of the vehicle during a braking event involving strong pressure on the brake pedal (ABS) and/or spinning of the driven wheels of the vehicle in the event of strong pressure on the gas pedal (ASR) can for instance be prevented. In a brake system serving as a steering aid (FDR), a brake pressure is built up in one or more wheel brake cylinders independently of an actuation of the brake pedal or gas pedal, for instance to prevent the vehicle from breaking out of the track intended by the driver. The pump can also be used in an electrohydraulic brake system (EHB), in which the pump pumps the brake fluid into the wheel brake cylinder or wheel brake cylinders if an electric brake pedal sensor detects an actuation of the brake pedal, or in which the pump is used to fill a reservoir of the brake system.

BRIEF DESCRIPTION OF THE DRAWINGS

The invention will be described in further detail below in terms of an exemplary embodiment shown in the drawings. shown are.

DESCRIPTION OF THE EXEMPLARY EMBODIMENT

Figure 1:
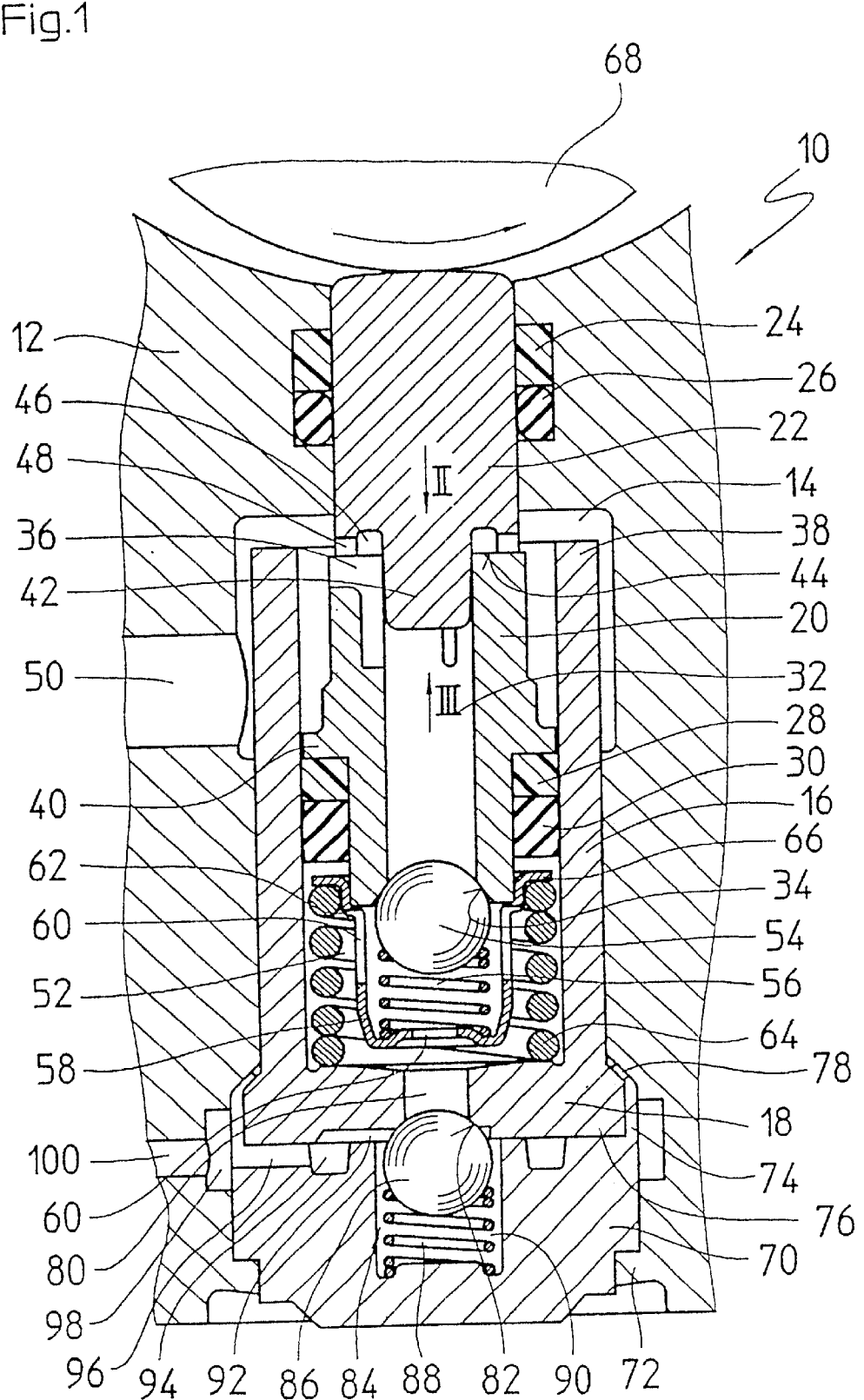
FIG. 1, an axial section through a piston pump of the invention.

The piston pump 10 of the invention, shown in FIG. 1, is inserted into a hydraulic block 12, of which only a fraction surrounding the piston pump 10 is shown in the drawing. Other hydraulic components not shown, such as magnet valves, hydraulic reservoirs and dampers of a slip-controlled vehicle brake system, are inserted into the hydraulic block 12 and hydraulically connected by the hydraulic block 12 both to one another and to the piston pump 10. The hydraulic block 12 forms a pump housing for the piston pump 10 of the invention and will be called the pump housing 12 hereinafter.

A bush 16 is press-fitted into a stepped, continuous bore 14 in the pump housing 12. The tubular bush 16 has a bush bottom 18 that is integral with it. A two-part piston 20, 22 is axially displaceably received in the bush 16. The two-part piston 20, 22 protrudes for part of its length from the bush 16. On its part protruding from the bush 16, it is guided axially displaceably in the pump housing 12 by a slide ring 24 and sealed off in the pump housing 12 by a sealing ring 26. The slide ring 24 and the sealing ring 26 are inserted into a common groove, which is made in the stepped bore 14 in the pump housing 12.

An end of the two-part piston 20, 22 located in the bush 16 is guided in the bush 16 by means of a second slide ring 28 mounted on the second two-part piston 20, 22 and is sealed off in the bush by means of a second sealing ring 30 mounted on the two-part piston 20, 22.

Figure 2:
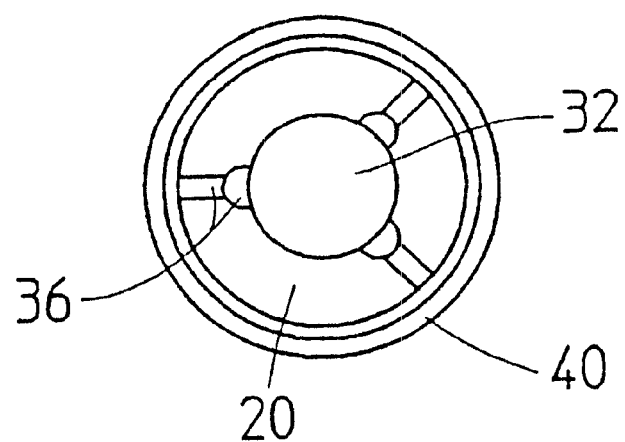
FIG. 2, an end view of a tubular piston part in the direction of the arrow II in FIG. 1.

The two-part piston of the piston pump 10 of the invention is composed of: a tubular piston part 20 and a closure plug 22 firmly joined to a face end of the piston part 20. The piston part 20 has a continuous axial bore 32, at whose orifice toward the bush bottom 18 a conical valve seat 34 is formed. On a face end of the piston part 20 on which the closure plug 22 is mounted and which is remote from the valve seat 34, the piston part 20 has three grooves, distributed over the circumference, which pass radially through an annular end face 44 of the piston part 20 and continue axially along the inside of the tubular piston part 20 over approximately ¼ to ⅓ the length of the piston part 20. The grooves 36 extending along the inside of the piston part 20 are accordingly open toward the axial bore 32 of the piston part 20. The disposition of the grooves 36 can be seen from the end view of the piston part 20 shown in FIG. 2.

Approximately in its longitudinal middle, the piston part 20 has a sealing collar 40 on its outside, as a bearing face for the slide ring 28 mounted on the piston 20, 22 and, via the slide ring 28, for the sealing ring 30. The piston part 20 is a deformed part made by extrusion without metal cutting. Including the valve seat 34, the grooves 36, and the radial collar 40, the piston part 20 is made exclusively by deformation; no metal-cutting machining or remachining is done. The valve seat 34 can be formed on, or formed on later, by swaging or reswaging. The swaging or reswaging serves to harden the material and to improve the dimensional stability of the valve seat 34. The grooves 36 and the radial collar 40 are formed by extrusion in the production of the piston part 20; a separate operation is not needed to produce them. The piston part 20 has no undercuts or the like whatever, and thus the piston part 20 can be made as a deformed part by extrusion without remachining.

Figure 3:
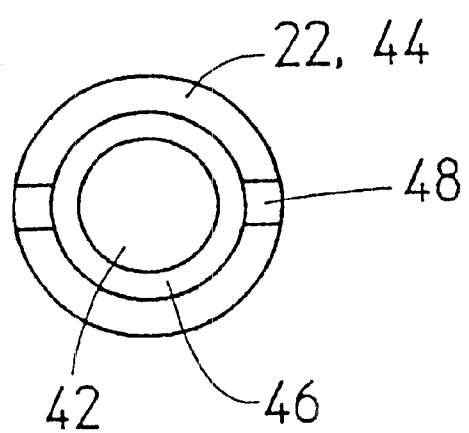
FIG. 3, an end view of a closure plug of the piston in the direction of the arrow III in FIG. 1.

The closure plug 22, whose end view is shown in FIG. 3, is a cylindrical part with a short coaxial protrusion 42, integral with it, on one face end. The closure plug 22 is press-fitted with the protrusion 42 into the axial bore 32 of the piston part 20, and there is a press fit between the protrusion 42 and the piston part 20 by means of which the piston part 20 and the closure plug 22 are firmly joined together.

In an annular end face 44 on which the closure plug 22 rests on the piston part 20, at the transition from the protrusion 42 to the closure plug 22, is an encompassing groove 46, surrounding the protrusion 42, from which two radial grooves 48 extend radially outward. The radial grooves 48, the encompassing groove 46 in the closure plug 22, the three grooves 36 and the axial bore 32 in the piston part 22, which all communicate with one another, all form a flow conduit of the piston 20, 22, at whose orifice toward the bush bottom 18 the valve seat 34 is embodied. The flow conduit 32, 36, 46, 48 serves the purpose of fluid admission, in the exemplary embodiment shown here of a piston pump 10 of the invention. The flow conduit 32, 36, 46, 48 may, however, equally well serve the purpose of fluid discharge, if a flow direction of an inlet valve and thus an outlet valve and hence the flow through the piston pump 10 is reversed compared with the exemplary embodiment shown.

The fluid admission to the piston pump 10 is effected through an inlet bore 50 in the pump housing 12, which discharges radially into the stepped bore 14 of the pump housing 12 into which the bush 16 is press-fitted, and then on around the end edge 38 of the bush 16 into the bush 16 and from there through the flow conduit 32, 36, 46, 48, which is open on the circumference of the two-part piston 20, 22, to the valve seat 34, or in other words to the face end of the piston 20, 22 toward the bush bottom 18.

It is not necessary for both the radial grooves 48 and the encompassing groove 46 to be made in the closure plug 22 and for the grooves 36 in the piston part 20 to pass through the piston part radially; it suffices for either the radial grooves 48 and the encompassing groove 44 to be made in the closure plug 22, or for the grooves 36 in the piston part 20 to discharge axially into the encompassing groove 46. If the grooves 36 in the piston part 20 pass radially through the piston part, then the radial grooves 48 and the encompassing groove 46 in the closure plug 22 can be omitted. In every case, a flow through the two-part piston 20, 22 from its circumference to the valve seat 34 is assured. The grooves 36 in the piston part 20 are axially longer than the protrusion 42 of the closure plug 22, so that at this location, too, a flow through the two-part piston 20, 22 is assured.

The closure plug 22 has no undercut at all, and so it, like the piston part, can be produced as a deformed part, for instance by extrusion or upsetting. A needle of a needle bearing can also be used as the closure plug 22; as a mass-produced part, it can be procured inexpensively. This is an attractive option, especially whenever no radial grooves 48 and no encompassing groove 46 are provided in the closure plug 22.

As its inlet valve 52, the piston pump 10 of the invention has a check valve, which is mounted on the face end of the two-part piston 20, 22 toward the bush bottom 18. The inlet valve 52 has a valve ball 54 as its valve closing body, which is pressed by a helical compression spring, acting as the valve closing spring 56, against the valve seat 34 on the two-part piston 20, 22. The valve ball 54 and the valve closing spring 56 are accommodated in a cup-shaped valve cage 58, which is made as a deep-drawn sheet-metal part and has fluid openings 60 in its circumference and bottom. The valve closing spring 56 is braced against the valve cage 58. With an annular shoulder 62 on its open face end, the valve cage 58 rests on the face end toward it of the two-part piston 20, 22. The valve cage 58 is kept in contact with the two-part piston 20, 22 by a piston restoring spring 64, which presses against a radial flange 66 that is formed on the free edge of the valve cage 58. The radial flange 66 simultaneously acts as a bearing face for the sealing ring 30 and holds the sealing ring, together with the slide ring 28, on the piston 20, 22. The piston restoring spring 64 is considerably stronger than the valve closing spring 56.

For driving the two-part piston 20, 22, the two-part piston pump 10 of the invention in a manner known per se has an eccentric element 68 which can be driven to rotate by an electric motor and which is disposed on a face end, remote from the inlet valve 52, of the two-part piston 20, 22 in the pump housing 12 and against whose circumference the two-part piston 20, 22 is pressed by the two-part piston restoring spring 64.

On a side remote from the eccentric element 68, a cylindrical closure part 70 is inserted into the bore 14 in the pump housing 12. The closure part 70 is fixed by an encompassing caulking 72 of the pump housing 12 and closes the bore 14 in pressure-tight fashion. For connection to the bush 16, the closure part 70 has a cylindrical edge 74, integral with it and protruding axially away, which axially grips a collar 76 of the bush 16 that protrudes past a circumference, and which is crimped inward (crimp 78).

A center hole 80 is made in the bush bottom 18, and a conical valve seat 82 of an outlet valve 84 of the piston pump 10 of the invention is formed on the orifice, remote from the two-part piston 20, 22, of this hole. The outlet valve has a value ball 86 as its valve closing body, which is pressed against the valve seat 82 by a helical compression spring acting as the valve closing spring 88. The outlet valve 84 is accommodated in a blind bore 90 in the closure part 70. A fluid discharge from the piston pump 10 is effected through three shallow, wide grooves 92, made in a star pattern in the bush bottom 18, which discharge into an annular groove 94 in the closure part 70 from which three radial grooves 96 extend outward in a star pattern. The annular grooves 96 in the closure part 70 communicate with an outlet bore 100 in the pump housing 12 via an annular conduit 98 disposed in the bore 14 of the pump housing 12.

The foregoing relates to a preferred exemplary embodiment of the invention, it being understood that other variants and embodiments thereof are possible within the spirit and scope of the invention the latter being defined by the appended claims.

We claim:

1. A piston pump for a vehicle brake system, comprising:

a pump housing (12);

a check valve (52) having a valve seat (34);

a piston (20, 22) that is driven to execute a reciprocating stroke motion and is axially displaceably received in said housing, the piston (20, 22) including a tubular deformed part (20), the inside of which forms a flow conduit (32, 36), which flow conduit admits fluid at one end of the tubular deformed part, and discharges fluid at the other end;

the valve seat (34) of the check valve (52) is formed onto the tubular deformed part (20), wherein the check valve (52) prevents return flow of fluid through the flow conduit (32, 36);

and the tubular deformed part (20) has a longitudinal groove, which groove forms the flow conduit (32, 36) at said one end of the tubular part;

the piston (20, 22) also including a closure plug (22) which is joined to the tubular deformed part (20) at said one end, and substantially closes the tubular deformed part (20) at said one end;

wherein the tubular part (20) is made by a cold forming process without any metal cutting or removing steps, such that the cold forming process hardens the surface of the tubular part and increases its dimensional stability and strength over what the part would have if shaped by a metal removing process.

2. The piston pump according to claim 1, in which the closure plug (22) has a first slide ring (24) for guidance in the pump housing (12), and the tubular part (20) of the piston has a second slide ring (28).

3. The piston pump according to claim 1, in which the groove (36) is formed by cold forming during the production of at least one of the tubular part (20) and the closure plug (22).

4. The piston pump according to claim 1, in which the check valve (52) is mounted on the tubular part (20).

5. The piston pump according to claim 1, in which the closure plug (22) rests against a surface of a rotatable cam surface which reciprocates the closure plug and tubular part.

6. The piston pump according to claim 1, in which the tubular deformed part does not have any transverse bores therethrough.

7. A piston pump for a vehicle brake system, comprising:

a pump housing (12);

a check valve (52) having a valve seat (34);

a piston (20,22) that is driven to execute a reciprocating stroke motion and is axially displaceably received in said housing, the piston (20,22) including a tubular deformed part (20), the inside of which forms a flow conduit (32,36), which flow conduit admits fluid at one end of the tubular deformed part, and discharges fluid at the other end, the tubular deformed part being formed by an extrusion process;

the valve seat (34) of the check valve (52) is formed onto the tubular deformed part (20), wherein the check valve (52) prevents return flow of fluid through the flow conduit (32, 36);

and the tubular deformed part (20) has a longitudinal groove, which groove forms the flow conduit (32, 36) at said one end of the tubular part;

the piston (20, 22) also including a closure plug (22) which is joined to the tubular deformed part (20) at said one end, and substantially closes the tubular deformed part (20) at said one end; and wherein the tubular part (20), being formed by an extrusion process without any metal removing or cutting steps, has hardened surfaces, dimensional stability and strength over what the part would have if shaped by a metal removing process.

8. The piston pump according to claim 7, in which the tubular deformed part has no transverse bores therethrough.

9. The piston pump according to claim 7, in which the check valve (52) is mounted on the tubular part (20).

10. The piston pump according to claim 7, in which the closure plug (22) has a first slide ring (24) for guidance in the pump housing (12), and the tubular part (20) of the piston has a second slide ring (28).

11. The piston pump according to claim 7, in which the closure plug (22) rests against a surface of a rotatable cam surface which reciprocates the closure plug and tubular part.

\* \* \* \* \*

UNITED STATES PATENT AND TRADEMARK OFFICE
CERTIFICATE OF CORRECTION

PATENT NO.    : 6,471,496 B1                                              Page 1 of 1
DATED         : October 29, 2002
INVENTOR(S)   : Dieter Merklein et al.

It is certified that error appears in the above-identified patent and that said Letters Patent is hereby corrected as shown below:

<u>Title page,</u>
Item [75], should read as follows:

-- [75]  Inventors:    Dieter Merklein, Kempten;
                       Andreas Weh, Durach;
                       Michael Hellebrandt, Burgberg; all of (DE) --

Signed and Sealed this

Twenty-eighth Day of January, 2003

JAMES E. ROGAN
*Director of the United States Patent and Trademark Office*